May 3, 1927.
E. A. SPERRY
1,627,210
VALVE MECHANISM FOR COMBUSTION ENGINES
Filed March 3, 1921   2 Sheets-Sheet 1
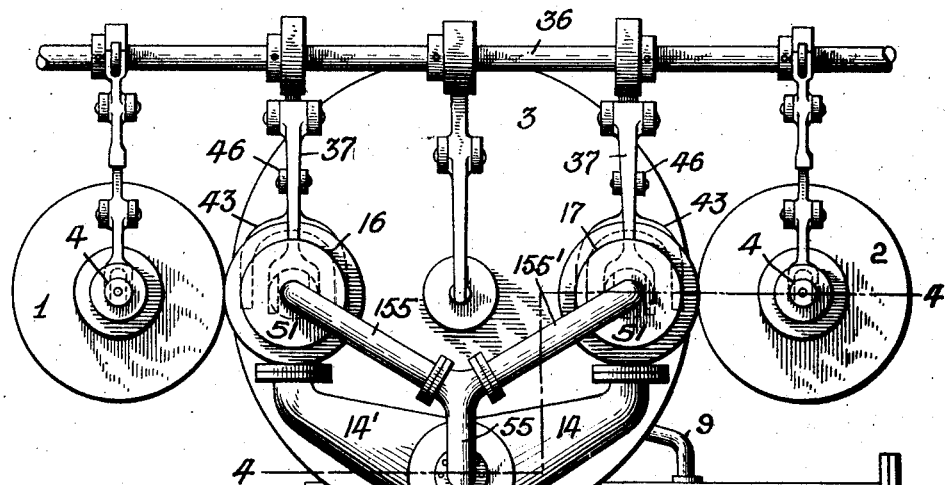
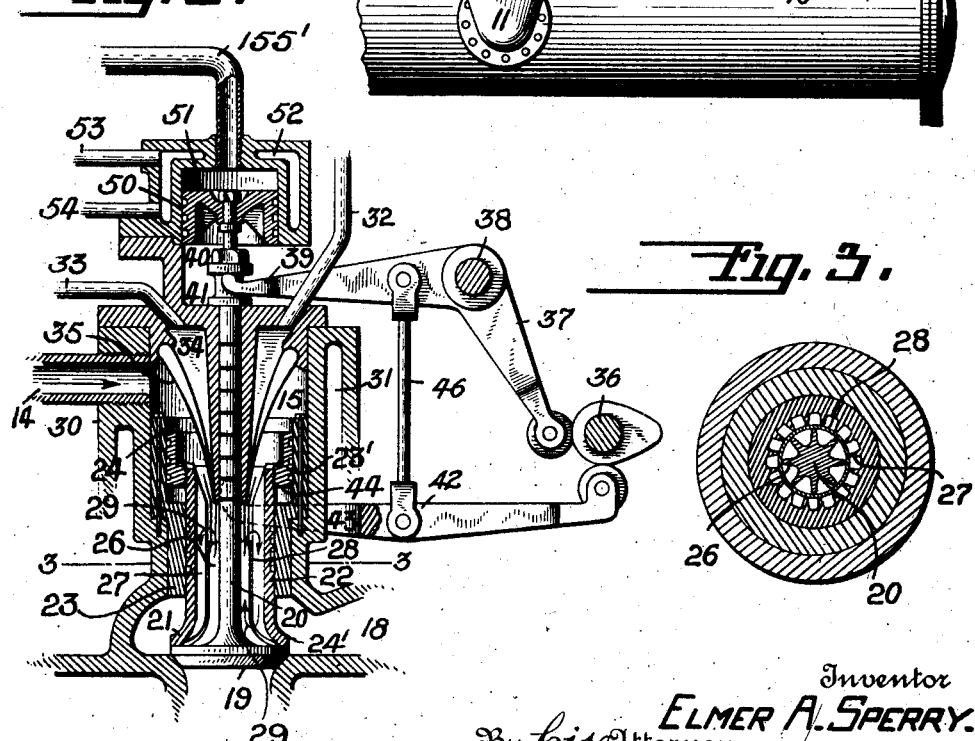
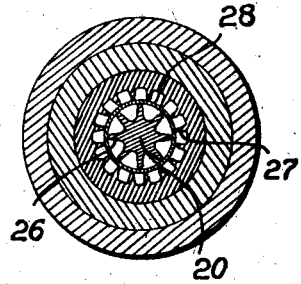
Inventor
ELMER A. SPERRY.
By his Attorney
Herbert H. Thompson May 3, 1927. 1,627,210
E. A. SPERRY
VALVE MECHANISM FOR COMBUSTION ENGINES
Filed March 3, 1921  2 Sheets-Sheet 2
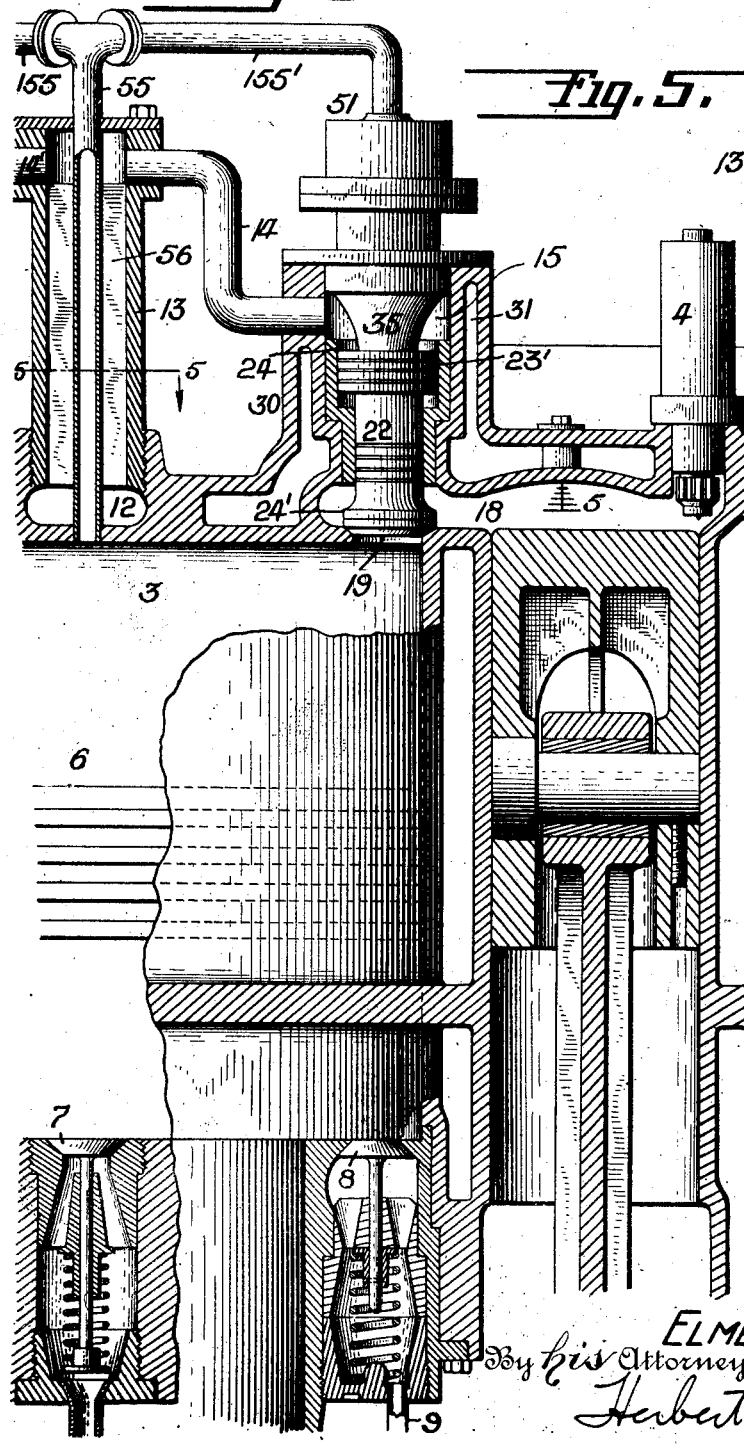
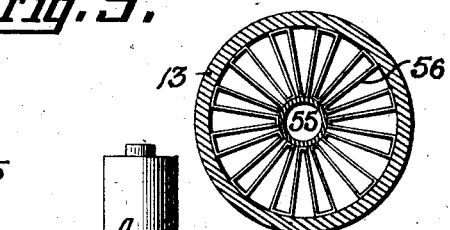
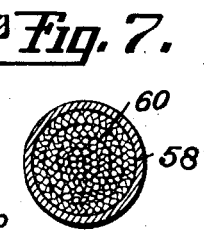
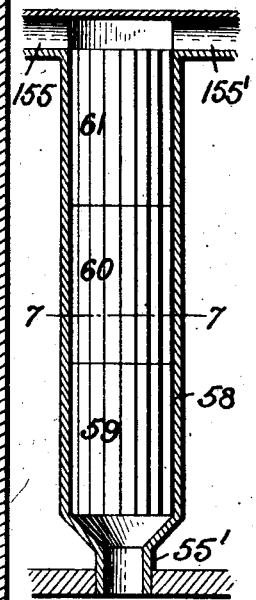
Inventor
ELMER A. SPERRY.
By his Attorney
Herbert H. Thompson Patented May 3, 1927.

1,627,210

UNITED STATES PATENT OFFICE.

ELMER A. SPERRY, OF BROOKLYN, NEW YORK, ASSIGNOR TO SPERRY DEVELOPMENT COMPANY, OF DOVER GREEN, DELAWARE, A CORPORATION OF DELAWARE.

VALVE MECHANISM FOR COMBUSTION ENGINES.

Application filed March 3, 1921. Serial No. 449,412.

This invention relates to internal combustion engines especially of the multiple expansion type and to the valve mechanism therefor. The invention has particular reference to the type of multiple expansion Diesel engine, shown and described in my copending application for Letters Patent Serial No. 405,917 "Diesel engines and method of operating the same," filed August 25, 1920, and has, for one of the objects, the improvement of the transfer and intake valve mechanisms for such engine, although the invention has a much broader application in the art, the invention having application to other types of heating engines and cycles wherein valves are employed to control the entrance of the hot working gases. In compound combustion engines a high pressure or combustion cylinder acts, of course, in two capacities, first, as a combustion space or chamber wherein the fuel is burned to produce the pressure, and second, as a means for partially expanding the working gases. The low pressure or expansion cylinder, on the other hand, operates solely as an expanding cylinder, the problem of admitting the hot gases thereto being substantially the same as in any heat engine wherein combustion takes place prior to the entry into the cylinder.

In an engine operated according to said application, sudden large fluctuations in pressure within both the combustion and expansion cylinders take place, the former being due to the detonating explosion constituting an important feature of my improved engine cycle and the latter being due in large part to the "cushioning" employed in the expansion cylinder. The general operation of this type of engine will be readily understood by reference to my Patent No. 1,325,810 dated December 23, 1919.

One of the objects of the invention is to overcome certain defects in the valve mechanism employed in this type of engine and to produce a valve mechanism which is entirely independent of springs and which, by its fundamental design, can not be blown off its seat.

Referring to the drawings, in which what I now consider the preferred form of my invention, is shown:

Fig. 1 shows a simplified plan view of the engine constructed according to my invention.

Fig. 2 is a vertical section of my improved combined transfer and intake valve.

Fig. 3 is a transverse section taken on line 3—3 of Fig. 2.

Fig. 4 is a vertical section of one half of my engine, taken approximately on line 4—4 of Fig. 1.

Fig. 5 is a section taken approximately on line 5—5 of Fig. 4 through the duct connecting the low pressure cylinder and the combined transfer and intake valve.

Fig. 6 is a vertical section through a modified form of pipe or duct connecting the low pressure cylinder and the balancing pistons on said valve.

Fig. 7 is a transverse section taken on line 7—7 of Fig. 6.

My preferred engine unit comprises a pair of high pressure or combustion cylinders 1 and 2 and a common low pressure or expansion cylinder 3, the combustion cylinders being four cycle and arranged to exhaust alternately into said common expansion cylinder. Each combustion cylinder is provided with a fuel injection valve 4, preferably of the high pressure, solid injection type as described in the aforesaid application and may also be equipped with an ignition coil 5. The piston 6 of the low pressure cylinder 3 also acts as a pump for pre-compressing the air supply for the high pressure cylinder. For this purpose poppet intake and outlet valves 7 and 8 are shown in the bottom of the cylinder 3, the former admitting the atmospheric air while the latter is connected by a pipe 9 to the pressure reservoir or tank 10. From said reservoir the induction air is led to the high pressure cylinder through pipe 11, port 12, cooling duct 13 (described in detail herinafter) and branch pipes 14, 14'. Pipe 14 leads to the passage 15 in the combined induction and transfer valve 17 while the pipe 14' leads to a similar valve mechanism 16 on the other cylinder through a similar passage 15, not shown. Such valves are preferably located within the clearance space 18 of the high pressure cylinder, the transfer valve proper 19 being located immediately over the top of the low pressure cylinder adjacent the high pressure cylinder with the stem 20 thereof leading upwardly through said clearance space 18.

The induction valve proper 21 is preferably seated on the top of the transfer valve and is made in a form of a sleeve extending upwardly through said space and having a restricted middle portion 22, having a piston fit in the valve housing 23.

For the purpose of holding both said valves on their seats, the said sleeve is provided with an enlarged upper portion 23′ shown in the form of a detachable piston threaded upon the upper end of the sleeve and having a piston fit within the annular wall 24. Said piston 23′, it will be seen, is subject to the pressure of the induction air within the space 15 and, therefore, tends to hold the valve 21 on its seat against the top of valve 19, thereby also holding valve 19 on its seat.

As pointed out above, in an engine of this class, the sudden variations in pressure in the high pressure cylinder tend to force the gas between the induction and transfer valves, thereby tending to lift the former off its seat. To prevent this, I prefer to provide the induction valve with a flaring inner end 24′ having an upwardly facing surface subject to the downward pressure of the gases within said clearance space 18. The diameter of said flaring end, while greater than that of the restricted middle portion 22 is preferably less than that of the piston 23′ in order to maintain the downward pressure of the intake compressed air within the space 15 and on sleeve 22 greater than the upward pressure thereof—in other words, so that the internal diameter of said flaring lower end 24′ is materially less than the diameter of said piston 24.

In order to cool the valve, especially the transfer valve, the upper surface thereof and the stem 20 are provided with means for increasing the area thereof exposed to the cooler induction air by means such as corrugations or ribs 26 while the interior of said sleeve is also provided with ribs 27 for the same purpose. By such means the area exposed to the cooler intake gases is made materially greater than the area of the valves exposed to the hot gases within the two cylinders. Preferably, also, a shield or baffle plate 28 is provided between the ribs of the two valves, thereby encouraging or assisting the circulation by convection currents of the air when the valves are closed since the air surrounding the ribs on the stem 20 generally becomes hotter than the air surrounding the ribs on the sleeve 22. Said plate stops short of the ribs both at the bottom and the top, so that the air may freely circulate, as indicated by small arrows 29. It also acts as a guide for both the stem and sleeve.

The valve is preferably also water jacketed as indicated at 30 and 31 and, in addition, water is preferably introduced within and immediately surrounding the upper portion of the valve stem 20 by means such as pipes 32 and 33, which keep the water circulating through the space 34.

The water is confined in such space and prevented from getting down into the valves by means of a conical shaped metallic member 35 preferably double walled, so that the cooling water will not cool off materially the induction air.

The valves are operated in any suitable manner from the cam shaft 36, the transfer valve being shown as lifted by means of a bell crank lever 37, pivoted at 38 and provided with a forked end 39 engaging between shoulders 40 and 41 on the upper portion of the valve stem.

A lever 43 provided with a forked end is shown for operating the induction valve. Said forked end engages under the annular shoulder 44 formed by the under portion of the piston 23′.

Preferably the pivotal point of support for said lever 43 is suspended from the bell crank lever 37 as by means of link 46, so that when the induction valve is raised, the transfer valve will still be held on its seat by means of the pressure of the intake air acting downwardly upon the induction valve, said pressure being then transferred through lever 43 to link 46 to rock the bell crank lever 37 counter-clockwise so that fork 39 presses the transfer valve stem 20 downwardly.

As described in said application, it is also necessary to balance the transfer valve against sudden variations in pressure in the low pressure cylinder. For instance—in this type of engine it is preferred to close the exhaust valve somewhat before the end of the upward stroke of the low pressure piston, thereby causing a sudden compression of the gases in the cylinder immediately prior to the opening of one or the other of the transfer valves. This sudden pressure tends to blow open one or both transfer valves, thus not only prematurely connecting the low pressure cylinder with the high pressure cylinder about to exhaust but also connecting it with the other high pressure cylinder and causing a serious disturbance in the cycle of the engine. To prevent this, therefore, a piston 50 is mounted on stem 20 of each transfer valve, being shown, is secured to the top thereof. Said piston works in a cylindrical housing 51 preferably water jacketed, as at 52, the water being circulated through pipes 53 and 54.

The cylinder 51 of each valve is placed in communication with the low pressure cylinder by suitable means such as a common duct or pipe 55 which branches into pipes 155 and 155′ leading to the two valves 16 and 17.

Owing to the high temperature of the transfer gases and the high temperature to which the exhaust gases within the low pressure cylinder are raised by cushioning, it is found that the duct 55 becomes intensely hot and that the hot gases passing therethrough seriously interfere with the proper lubrication of the piston 50. In order to cool said duct and the gases passing therethrough without serious heat losses in the engine, I prefer to cause the intake air to pass over or around said duct before it enters the engine. For this purpose, I have shown the intake air as entering through the port 12 as described above and passing upwardly through the large tube 13 surrounding the pipe 55. Said pipe is provided with plurality of heat radiating fins 56 so that a maximum amount of heat is absorbed by the induction air. By imparting this heat to said air, it will be at once apparent that the heat abstracted from the equalizing duct 55 is not dissipating but improves the thermo-dynamic operation by increasing the temperature of the induction air or other gases.

An alternative means of accomplishing the cooling of the said duct with the gases passing therethrough is shown in Figs. 6 and 7.

According to this modification, the duct 55' is provided with an enlarged portion 58 which may be filled with cellular heat absorbing material. Said material may be made in several layers 59, 60 and 61 of different heat resisting qualities, the lower layer being composed of a refractory substance such as Monel metal, the middle layer of copper and the upper layer of aluminum. The structure of the cellular substances is so arranged as not to interfere with the passage of gases through the enlarged portion 58.

It is found in an engine of this type that the increase in temperature of the gases occurs with great suddenness as the large low pressure piston approaches the top of the stroke while the expansion of the gases occurs much more slowly since during the expansion stroke the high and low pressure cylinders are placed in communication and a larger quantity of compressed gas is available. It is found, therefore, that the heat absorbed by the cellular metals as the intensely hot air rises therethrough is easily re-absorbed by the gases as they repass at a slower rate through the metals on their return to the cylinders. Thus, in this case also, the heat absorbed by the gases is not dissipated but is returned to the engine.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a combustion engine having a working cylinder, a valve adjacent thereto for controlling communication therewith, a balancing piston and cylinder for said valve, means for passing gases from said working cylinder to the said balancing cylinder, and means for absorbing heat from the gases passing through said first named means by the gases passing to the working cylinder.

2. In a combustion engine having a working cylinder, an air intake passage therefor, a valve controlling communication with said cylinder, a balancing cylinder and piston for said valve, means for passing gases from the working cylinder to the balancing cylinder, and means whereby the said intake air absorbs heat from the gases passing through said first named means.

3. In a compound combustion engine having a combustion chamber, an expansion cylinder, a valve in said cylinder having a balancing chamber connected by a duct with said cylinder, a balancing piston therein for said valve, and means for absorbing heat from said duct and retaining the same in the engine.

4. In a compound combustion engine having a combustion chamber, an air intake passage therefor, an expansion cylinder, a valve in said cylinder having a balancing chamber connected by a duct with said cylinder, a balancing piston therein for said valve, and means for absorbing heat from said duct and imparting it to the intake air.

5. In a compound combustion engine, the combination with combustion and expansion cylinders, an air intake passage, a valve, a balancing piston therefor, a cylinder for said piston, a duct leading from the expansion cylinder to said last-named cylinder, heat radiating means associated with said duct and means for guiding the intake air thereover as it passes to the combustion cylinder.

6. In a compound combustion engine, the combination with combustion and expansion cylinder, a valve, a balancing piston therefor, a cylinder for said piston, a duct leading from the expansion cylinder to said last-named cylinder, heat absorbing means associated with said duct whereby heat is abstracted from the hotter gases passing toward the last-named cylinder, and means whereby said heat is retained in the system.

7. In a compound combustion engine having a pair of combustion chambers, an expansion cylinder, a passage from each of said chambers to said cylinder, a transfer valve for each of said passages, a balancing cylinder and piston connected with each valve, a duct from the expansion cylinder in communication with both balancing cylinders, and an intake passage in communication with both combustion cylinders, said passage surrounding said duct whereby heat from the gases within the duct is absorbed by the intake air.

8. An outwardly opening sleeve valve for combustion engines having a combustion cylinder, said valve being exposed to pressure fluctuations within the cylinder comprising a central restricted portion, a housing therefor, said portion having a piston fit in its housing, a flaring inner end extending within the clearance space of the cylinder, a seat upon which said inner end normally rests, said end being of greater diameter than said central restricted portion, whereby the pressure fluctuations will not raise the valve from its seat.

9. The combination with a combustion engine in which the intake air is precompressed, of a sleeve valve exposed to pressure fluctuations within the cylinder comprising a central restricted portion, a housing therefor, said portion having a piston fit in its housing, an inner enlarged portion constituting a piston exposed to the pressure of the intake air which enters the cylinder through said sleeve valve, and a flaring outer end of a diameter intermediate between that of the upper piston and the central portion.

10. In an internal combustion engine having a combustion chamber, a source of precompressed air therefor, and a passage connecting said source with said chamber, a valve located intermediate said passage and said chamber having a hollow stem through which the air passes, said stem being formed with two diameters, cylinders fitting each of said diameters, the larger diameter of the stem being at one end, the opposite end of said stem being intermediate in diameter between that of the two cylinders and located within said chamber, and a seat adjacent said latter end thereby constituting the control valve between said air source and said chamber.

11. In an internal combustion engine having a combustion chamber, an expansion cylinder in communication therewith, a source of precompressed air, and a passage connecting said source with said chamber, a composite valve for controlling the communication between said chamber and said cylinder and air source having a valve within the combustion chamber controlling the communication between the combustion and expansion chambers, and a hollow piston surrounding said first valve located in said passage and chamber in two diameters having an enlarged end of an intermediate diameter extending into said chamber and resting upon said first valve thereby forming the air induction valve.

12. In an internal combustion engine having a multi-stage compression for the intake air and a multi-stage expansion of the hot products of combustion, a composite valve having a hollow piston of two diameters formed at one end with a shoulder constituting the air induction valve-part, cylinders fitting each of the said diameters, the shoulder being intermediate in diameter between that of the two cylinders, a cooperating valve-part which controls the combustion products having a stem extending interior to the piston valve and radiating fins facing each other on both stem and internal face of said piston valve in line of travel of the fluid within the valve, said shoulder resting upon said cooperating valve part.

13. In a multiple expansion engine having a combustion chamber, an expansion cylinder in communication therewith, an outwardly opening transfer valve controlling said communication, a source of precompressed air, a passage connecting said source with said chamber, a hollow intake valve controlling said passage seated on said transfer valve, a piston on said intake valve exposed to the pressure of said intake air, said valve having a flaring inner end of less internal diameter than said piston for the purpose specified.

14. In a multiple expansion internal combustion engine, the combination with high and low pressure cylinders, the former having a substantial clearance space, a transfer valve having a stem passing through said space, and a protective sleeve within said clearance space shielding said valve and stem, said sleeve having a flaring end for the purpose specified.

15. In a multiple expansion internal combustion engine, the combination with high and low pressure cylinders, the former having a substantial clearance space, a transfer valve having a stem passing through said space, a protective sleeve shielding said valve and stem, said sleeve constituting an intake valve, and means for increasing the pressure to close said sleeve on rise in pressure in said clearance space.

16. In a multiple expansion combustion engine, a combined induction and transfer valve, comprising an inner valve and valve stem, an outer hollow or sleeve valve, each of said valves having ribbed surfaces facing each other, and a shield of less length than said ribbed surfaces mounted therebetween for the purpose specified.

17. In a multiple expansion engine in which the intake air is precompressed, a transfer valve, an intake valve, one of said valves being seated on the other, and two enlarged surfaces on the valve which is seated on the other, one of which surfaces is exposed to said precompressed intake air and the other to the pressure within one of said cylinders for holding both valves on their seats.

18. In a combustion engine, the combination with a cylinder, of a valve therefor, a balancing piston for said valve, a cylinder for said piston, a duct connecting the interior of the first-named and said last-named cylinders, and means for abstracting heat from the gases passing through said duct.

19. In a compound combustion engine having a pair of combustion cylinders, a common expansion cylinder, a transfer valve connecting each combustion cylinder with the expansion cylinder, a balancing piston connected with each valve, a cylinder for each piston, a common duct leading to both of said last-named cylinders from the expansion cylinders, and means associated with said duct for absorbing heat from the gases as they pass toward either balancing cylinder and reimparting heat to said gases as they return to the expansion cylinder.

20. In a multiple expansion combustion engine, a combined induction and transfer valve, comprising an inner valve and valve stem, an outer hollow or sleeve valve, each of said valves having ribbed surfaces facing each other and an annular baffle plate between the intermediate portions of said ribbed surfaces.

21. In a combustion engine comprising a combustion chamber, an expansion chamber, a passage between said chambers, and a valve controlling said passage, a sleeve valve for controlling the passage of intake gas to the combustion chamber comprising a sleeve surrounding said first-named valve movable independently thereof having a flaring end located within the chamber whereby the sleeve valve is held on its seat by pressure within the latter chamber.

22. In a combustion engine comprising a combustion chamber, an expansion chamber, a passage between said chambers, and a valve controlling said passage, a sleeve valve for controlling the passage of intake gas to the combustion chamber comprising a sleeve seated on said first named valve having a flaring end located within the combustion chamber whereby both the sleeve valve and piston are held on their seats by pressure within the latter chamber.

23. In a heat engine comprising a combustion chamber, an expansion chamber, a passage between said chambers, and an outwardly opening poppet valve controlling said passage, a sleeve valve for controlling the gases at a different part of the cycle comprising a sleeve seated on the back of said first named valve movable independently thereof, having a flaring end in communication with said expansion chamber whereby both the sleeve valve and piston are held on their seats by pressure within the latter chamber.

24. In a compound combustion engine having a pair of combustion chambers, an expansion cylinder, a passage from each of said cylinders to said chamber, a transfer valve for each of said passages, a balancing piston connected with each valve, a cylinder for each of said pistons, a duct from the expansion cylinder in communication with both last-named cylinders, and an intake passage in communication with both combustion cylinders, said duct and passage being arranged to pass through one another so that heat from the gases within the duct is absorbed by the intake air or gas.

25. In a combustion engine comprising a combustion chamber, an expansion chamber, a passage between said chambers, a valve controlling the passage of the hot gases from said combustion to said expansion chamber, a sleeve valve for controlling the passage of the cooler gas comprising a sleeve having a flaring end located within the chamber and seated on said valve whereby the sleeve valve is held on its seat by pressure within the latter chamber.

26 In a combustion engine comprising a combustion chamber, an expansion chamber, a passage between said chambers, and a valve controlling said passage, a sleeve valve for controlling the passage of intake gas to the combustion chamber comprising a sleeve having an enlarged portion at one end constituting a piston exposed to the pressure of the intake gas which passes through said sleeve, and a flaring outward portion at its opposite end located within the combustion chamber.

27. A combined inlet and outlet valve for heat engines comprising an outwardly opening poppet valve, and a sleeve valve seating on the back thereof, the latter having a flaring mouth and a restricted portion, a housing therefor spaced from said mouth, said portion having a piston fit in said housing whereby the pressure around said mouth holds both valves on their seats.

28. A combined inlet and outlet valve for heat engines comprising an outwardly opening poppet valve, and a sleeve valve seating on the back thereof, the latter having a flaring mouth and a restricted portion, a housing therefor spaced from said mouth, said portion having a piston fit in said housing whereby the pressure around said mouth holds both valves on their seats, means for operating the poppet valve to admit the working gases to the engine, and means of operating the sleeve valve to cause gases at a lower temperature to pass therethrough during each engine cycle.

29. In a heat engine comprising a combustion chamber, an expansion chamber, a passage between said chambers, and a poppet valve controlling said passage to admit the hot gases to said expansion chamber, a sleeve valve for controlling the passage of cooler gases at a different part of the cycle comprising a sleeve seated on said first named valve movable independently thereof, and having a flaring end in communication with said expansion chamber whereby both the sleeve valve and piston are held on their seats by pressure within the latter chamber.

In testimony whereof I have affixed my signature.

ELMER A. SPERRY.